UNITED STATES PATENT OFFICE 2,295,036

VITAMIN B₁ ASSIMILATION BY YEAST

Henry J. Gorcica and Harold Levine, Milwaukee, Wis., assignors to Pabst Brewing Company, Chicago, Ill., a corporation of Delaware No Drawing. Application May 20, 1940, Serial No. 336,236

8 Claims. (Cl. 99—96)

This invention relates to a vitamin product and a method of producing the same from brewery wastes and the like, and more particularly it relates to a biological process of obtaining in concentrated form vitamin $B_1$, the antineuritic vitamin, from waste yeast.

It has been customary heretofore to utilize brewer's waste yeast by drying or compressing it or making yeast extracts therefrom. Yeast extracts do not have a sufficiently large market to permit utilization of the large quantities of waste yeast available. The dried yeast is the more desirable form for marketing waste yeast, but it is only profitably prepared from yeast which has not undergone any appreciable degree of decomposition. To prevent decomposition, it is necessary to prepare the yeast product rapidly or maintain it at relatively low temperatures, which procedures may be difficult and expensive when it is necessary to collect the yeast from widely separated breweries producing it in only small quantities.

It has been discovered, in accordance with this invention, that a waste yeast, even in an advanced state of decomposition such as might render it unfit for food purposes, can be used for the production of a new crop of yeast having a high vitamin B potency which may be dried to produce a readily salable dried yeast product.

Yeast is a well recognized source of vitamin $B_1$. Commercial yeasts now on the market have a vitamin $B_1$ potency ranging from 5 to 15 International units per gram (dry basis) for baker's yeast, to 20 to 65 International units per gram (dry basis) for brewer's yeast. No method has been described for producing a yeast consistently having a higher vitamin $B_1$ potency than 100 International units per gram. Likewise, no method has been previously described for recovering the vitamin $B_1$ normally present in waste yeast.

It is an object of this invention to provide an improved yeast product having a high vitamin $B_1$ potency.

It is a further object of this invention to provide a method of concentrating vitamin $B_1$ from a solution (such as may be prepared from waste yeast) containing the vitamin in relatively small concentrations.

A further object of this invention is to provide a method for producing a yeast culture having a desired predetermined vitamin $B_1$ potency.

A further object of this invention is to provide a method for utilizing certain industrial waste materials, such as brewer's waste, for the production of a high vitamin $B_1$ potency yeast.

Further objects will appear from the following description and the accompanying claims.

In accordance with this invention, it has been discovered that an actively growing culture of yeast can be made to assimilate a substantial proportion of the vitamin $B_1$ normally present in the culture medium in which it is grown to thus produce yeasts of higher potency than have been produced heretofore. The quantities of vitamin $B_1$ which the cells in a growing yeast culture adsorb or assimilate from the medium vary somewhat for the different strains of yeasts used, but the ordinary yeasts, such as baker's and brewer's yeasts, are able under suitable conditions to adsorb, under proper conditions of growth, up to about 1200 International units of vitamin $B_1$ per gram of dry yeast substance produced during growth. (One International unit of vitamin $B_1$ as used herein is the biological equivalent of three gamma of thiamin, one gamma being equal to one one-thousandths of a milligram.)

In accordance with one embodiment of this invention, a water extract of an organic substance, such as brewer's yeast, which normally contains relatively low concentrations of vitamin $B_1$, is prepared, to which an amount of a yeast fermentable carbohydrate may be added. The extract, which is preferably free from substantial amounts of solid matter, is further treated, if necessary, such as by the adjustment of the pH, to provide a suitable medium upon which a yeast culture may grow. A yeast culture is then inoculated into the medium thus prepared and the inoculated mass is incubated for a period to permit substantial multiplication of the yeast cells in the culture. The growing yeast cells assimilate or adsorb substantial quantities of the vitamin $B_1$ contained in the medium. After the incubation period the resulting yeast crop is separated from the medium and the yeast contains a high vitamin $B_1$ potency which may vary between about 100 and 1200 International units per gram (dry weight basis), depending on the total yeast crop and the initial vitamin potency of the original medium.

Materials and combinations thereof which have been found to be desirable for preparing the culture medium upon which the yeast is grown may be water extracts of brewer's yeast, ale yeast, rice polish, barley polish, wheat germ, malt sprouts, alfalfa leaf meal, or any organic substance containing vitamin $B_1$. In fact, any organic substance containing vitamin $B_1$ may be used, providing an extract can be prepared from it which is suitable for supporting the growth of yeast therein either with or without the addition of other substances such as carbohydrates, mineral salts, acids, alkalis, and the like. The process of the present invention thus provides a method for the utilization of various industrial waste products, but is especially adapted to the utilization of wastes obtained from breweries. The vitamin $B_1$ content of these products is salvaged and concentrated in a desirable form.

Any desired yeast fermentable carbohydrate may be used for promoting the growth of the yeast on the vitamin $B_1$-containing extract. It may be present in the extract itself or it may be added from some extraneous source in suitable quantities. Suitable sources of carbohydrate are glucose, sucrose, cane molasses, beet molasses, beer wort, malt extract, saccharified rice polish extract, saccharified corn grits extract, saccharified beer and ale solids, and the like. The concentrations of water soluble solids in the resulting culture medium may vary within wide limits so long as the growth of a yeast therein is not impaired. Generally, however, the total solids in the extract should be between 0.5% and 13.0%.

In accordance with this invention, it is important that the total amount of fermentable sugars present in the extract be adjusted so that the ratio of yeast crop grown therein to the total vitamin $B_1$ content of the medium results in a yeast crop having the desired vitamin $B_1$ potency. For example, if one liter of medium contains a total of 1000 International units of vitamin $B_1$ and if a yeast crop is desired having a potency of 1000 International units per gram (dry basis), then the total yeast crop must not be greater than one gram even if the yeast crop assimilates all of the vitamin $B_1$ in the medium. Under normal conditions of growth, 4 to 5 grams of fermentable carbohydrate in a medium will produce one gram of yeast cells. Consequently, it will be desirable to have between 4 and 5 grams of sugar in the liter of medium from which it is desired to obtain one gram of yeast cells having 1000 International units per gram on the dry basis (assuming that 100% of the vitamin $B_1$ is assimilated from the medium by the yeast cells). If, however, a yeast crop is desired from the same solution having a potency of about 200 International units per gram, the total amount of yeast crop formed should be about 5 grams and between 20 and 25 grams of sugar are provided in the original culture medium. The figures given above are only approximations, but serve to indicate, at least within certain limits, that the vitamin $B_1$ potency of the yeast crop is inversely proportional to the amount of sugar or yeast fermentable carbohydrate present in the original medium.

In accordance with this invention, the incubation of the yeast in the carbohydrate-containing extract medium may be carried out at any temperature within the temperature limits of good growth for yeast, ordinary room temperatures being entirely satisfactory for the purpose. The pH of the medium may range from about 4.0 to 7.0 without any substantial effect on the process. However, it is desirable that the initial medium be adjusted to pH 4.5 as best suited for the growth of yeast in the medium. The time of incubation for the development of the yeast crop should be sufficiently long to permit good growth of the yeast which ordinarily takes place in from 8 to 24 hours at room temperature.

As previously indicated, any suitable organic material may be employed for the process, provided that a vitamin $B_1$-containing water extract may be prepared from it and provided further that said extract will support the growth of yeasts. Generally speaking, the maximum vitamin $B_1$ potency consistently obtainable in yeast grown on the extract is about 1000 International units per gram. However, under most favorable conditions, the potency may be as high as 1200 International units per gram. A yeast having any predetermined high potency between about 100 and 1000 International units per gram (dry basis) may be produced by controlling the original vitamin $B_1$ and carbohydrate content of the medium in which the yeast is grown. It should be understood, however, that a maximum vitamin $B_1$ potency yeast is not practicably attainable from any vitamin $B_1$-containing solution that could possibly be prepared. It may not be practicable to harvest an extremely minute crop of yeast from a relatively large volume of culture medium. For example, if the culture medium contained only 10 International units per liter, in order to get a yeast having 1000 International units per gram, it would be necessary to restrict the total yeast crop to one gram per 100 liters, which is, for most purposes, entirely impracticable. Generally speaking, it is neither advisable nor economical to try to grow a yeast in a concentration of less than 3 or 4 grams per liter. Therefore, a solution containing less than about 100 to 150 International units of vitamin $B_1$ per liter should first be concentrated up to that strength. Conversely, a solution containing more than about 10,000 International units per liter should be diluted to that strength in order to render the process described in the present invention practicable. If the concentration of vitamin $B_1$ in the solution is too high (that is, above about 10,000 International units per liter), too much of it is left in the fermented liquor and the amounts left increase with increasing concentration.

For a more complete understanding of this invention, the following example is given to disclose in detail one method for carrying out the various steps for obtaining a yeast having a high vitamin $B_1$ potency. A yeast extract medium was prepared from 100 pounds of brewer's yeast press cake and 30 gallons of water by thoroughly mixing the two components at 70° C. and digesting the mixture at that temperature for about one-half hour. The mixture was acidified with 250 cc. of commercial concentrated hydrochloric acid (38% HCl) and the digested yeast suspension was cooled to 10° C. and maintained at that temperature for 24 hours. At the end of this period, the insoluble matter in the suspension had settled out in a thin layer at the bottom of the vessel and 25 gallons of clear supernatant liquor was decanted and used as the vitamin $B_1$-containing extract for preparing the medium for growing the high potency yeast. This yeast extract contained 12 grams of solids per liter in solution and the pH was 4.6.

A solution of cane molasses was prepared in four gallons of hot water and treated with a small amount of decolorizing carbon and subsequently filtered. The filtered molasses solution was added to the yeast extract, prepared as indicated above, to produce a finished culture medium having a total volume of 29 gallons containing in solution 3355 grams of total solids, of which 1320 grams were yeast extract solids and 2035 grams were molasses solids comprising chiefly sucrose. This culture medium had a vitamin $B_1$ potency of between 400 and 500 International units per liter.

The culture medium was then inoculated with 166 grams of a commercial baker's yeast cake (equivalent to about 33 grams of yeast substance) and aerated vigorously for 24 hours at 25° C. At the end of that time the resulting yeast crop was collected in a centrifuge, washed with water, filtered, and dried. The weight of the yeast crop in the form of filter cake was 1730 grams and when air-dry was 440 grams. The total amount of solids fermented or assimilated by the yeast from the medium was 1848 grams or 55% of the total. This is equivalent to 91% of the molasses solids.

The vitamin $B_1$ potency of the yeast crop was 1025 International units per gram of dry yeast substance and the total vitamin $B_1$ content of the yeast crop was 89% of the total amount of vitamin $B_1$ originally present in the 29 gallons of culture medium, indicating that 89% of the vitamin $B_1$ had been assimilated from the extract medium by the yeast. The vitamin $B_1$ potency of the baker's yeast used as an inoculant was only 10 International units per gram of solids. Therefore, an increase of over one-hundred-fold in the vitamin $B_1$ potency of the baker's yeast was effected by cultivating it in the manner indicated above.

In accordance with the present invention, it is necessary for the yeast to be actively grown in the medium from which it is desired to concentrate the vitamin $B_1$ as indicated above. Apparently the vitamin $B_1$ is not directly adsorbed merely by contact with yeast cells, but becomes assimilated with the yeast or incorporated therewith in a not very well understood manner only when the yeast is actually grown in the culture medium. Thus, in order to obtain the best results, it has been found that the inoculum added to the culture medium should be proportioned so as to permit at least a three-fold growth of the yeast during the incubation period. If less than a three-fold development of the culture is permitted, decreased amounts of vitamin $B_1$ are assimilated from the medium by the yeast. In general practice, it is preferred to proportion the inoculum such that a four to ten-fold increase will take place in the yeast that is introduced into the medium as the inoculum.

In accordance with the present invention, it has been found that a yeast having any predetermined vitamin $B_1$ potency may be prepared by adjusting the ratio of vitamin $B_1$ and fermentable carbohydrate in the medium into which the yeast is inoculated. This ratio may be conveniently expressed as the number of International units of vitamin $B_1$ per gram of assimilable solids (fermentable carbohydrate) in the medium. The ratio is thus independent of the actual concentration of the vitamin and carbohydrate in the medium and it may be varied over a wide range, depending on the results desired. The best results, however, have been obtained when the ratio is between about 30 and 300. When the ratio falls within this range, the percentage of vitamin $B_1$ assimilated by the yeast is very high, usually above 70%, and normally between 85% and 95%, or even higher.

The yield of yeast from the medium is dependent largely upon the concentration of fermentable carbohydrate within the medium. Under normal conditions of fermentation such as indicated above, the amount of dry yeast cells produced in a liquid medium is about 25% of the amount of the total fermentable carbohydrate contained within the medium. The amount of sugar in the medium should be further regulated so that an at least three-fold increase in the number of yeast cells used as inoculum occurs on incubation, but in small enough concentrations to permit substantially all of it to be fermented.

In order to produce a yeast crop having a predetermined vitamin $B_1$ potency in accordance with this invention, the following formula has been found convenient:

$$\text{Ratio} \frac{B_1}{\text{sugar}} = \frac{\text{desired potency} \times \text{yeast crop}}{\text{expected percentage of pick-up}}$$

in which the $$\text{Ratio} \frac{B_1}{\text{sugar}}$$

is in International units of vitamin $B_1$ per gram of assimilable solids in the medium; "desired potency" is expressed in International units of $B_1$ per gram of the resulting dried yeast crop; "yeast crop" is the number of grams of dried yeast substance (including inoculum) produced per gram of assimilable solids in the medium; and "expected percentage of pick-up" is the percentage of the total vitamin $B_1$ originally in the medium that is assimilated by the yeast crop. Under normal fermentation conditions as indicated above, the yeast crop is about 25% of the assimilated solids and the expected pick-up is about 90%, so that the above equation simplifies to the following form:

$$\text{Ratio} \frac{B_1}{\text{sugar}} = \frac{\text{desired potency} \times 0.25}{0.90}$$

Now, for example, if it is desired to grow a yeast of vitamin $B_1$ potency of 400 International units per gram, a medium should be prepared having a ratio of vitamin $B_1$ to assimilable sugar equal to about $$\frac{400 \times 0.25}{0.90} = 111.0$$

A method has thus been disclosed in which a yeast having a high vitamin $B_1$ potency (above 100 International units per gram) may be produced and that potency may be predetermined by adjusting the relative concentrations of vitamin $B_1$ and the assimilable sugars in the medium on which the yeast is grown.

It should be understood that the above example is not to be construed in any way to limit the herein disclosed product or process. For example, in the preparation of the yeast extract medium, it is not necessary to wait for the digested yeast residue to settle, and the digested suspension may be cooled and passed through a filter press or centrifuged in a bowl type centrifuge. Also the digestion of the yeast may be effected at various other temperatures before the clear extract is obtained. As previously indicated, other sources of vitamin $B_1$, other sources of fermentable sugars, and other fermentation conditions than those given in the example may be used with equally good results. Whenever the source of either the vitamin or the fermentable sugar used for preparing a medium comprises any substance that contains large amounts of starch, dextrins, or gums, it has been found advantageous, both from the standpoint of increasing the yield of sugar in the extract and of improving the ease of physical handling of the material, to carry out a preliminary digestion of the material with an acid or an enzyme such as a diastatic extract of malt.

A process thus has been provided for recovering vitamin B₁ from certain industrial waste products and for simultaneously concentrating the vitamin in a form heretofore unobtainable.

The process has particular utility for producing a yeast crop having any desired predetermined high natural vitamin B₁ potency, preferably between 100 and 1200 International units per gram. It also is useful for preparing a yeast product having higher natural vitamin B₁ potency than has been known heretofore, principally in concentrations above 300 International units per gram and particularly in the range of concentrations between 500 and 1200 International units per gram.

While a particular embodiment of this invention is shown above, it will be understood, of course, that the invention is not to be limited thereto, since many modifications may be made, and it is contemplated, therefore, to cover any such modifications as fall within the true spirit and scope of this invention.

We claim:

1. A method of concentrating vitamin B₁ from a vegetable extract medium having a vitamin B₁ potency between 100 and 10,000 International units per liter which comprises adding a yeast fermentable carbohydrate to said medium in an amount such that the ratio of International units of vitamin B₁ to the grams of carbohydrate in the medium is between about 30 and 300, inoculating the medium with a small quantity of yeast, incubating the resulting culture to obtain at least a three-fold increase in the amount of yeast introduced as inoculum whereby the growing yeast assimilates a substantial proportion of the vitamin B₁ in the medium, and separating the resulting yeast cells having a vitamin B₁ potency in excess of 100 International units per gram (dry basis).

2. A method of producing a mass of yeast cells having a vitamin B₁ potency in excess of 100 International units per gram (dry basis) which comprises preparing a substantially water clear yeast extract medium having a vitamin B₁ potency of the order of magnitude of 1000 International units per liter of medium, adding a yeast fermentable carbohydrate to said medium in an amount such that the ratio of International units of vitamin B₁ to the grams of carbohydrate in the medium is between about 30 and 300, pasteurizing the medium, cooling, inoculating the medium with a quantity of yeast cells which is less than about one-third of that quantity of yeast cells capable of developing in the medium on incubation, incubating the medium to get the desired at least three-fold increase in said yeast cells whereby the cells assimilate a substantial proportion of the vitamin B₁ in the medium, and separating the resulting cells having the desired vitamin B₁ potency.

3. The method of claim 2 in which the quantity of yeast cells developed in the medium is sufficient to assimilate about 90% of the vitamin B₁ contained in the medium.

4. A method of producing a mass of yeast cells having a predetermined vitamin B₁ potency which comprises preparing a substantially water clear, vitamin B₁-containing, vegetable extract medium capable of supporting the growth of yeast therein, inoculating the medium with a quantity of yeast cells, incubating the resulting medium to get a substantial growth of said yeast cells whereby said cells assimilate a substantial proportion of the vitamin B₁ in the medium, and separating the cells having the desired vitamin B₁ potency, said medium containing a fermentable sugar and vitamin B₁ in relative concentrations represented by the following formula:

$$\text{Ratio} \frac{B_1}{\text{sugar}} = \frac{\text{desired potency} \times \text{yeast crop}}{\text{expected percentage of pick-up}}$$

wherein $$\text{"Ratio} \frac{B_1}{\text{sugar}} \text{"}$$

is in International units of vitamin B₁ per gram of assimilable solids in the medium; "desired potency" is expressed in International units of B₁ per gram of the resulting dried yeast crop; "yeast crop" is the number of grams of dried yeast substance (including inoculum) produced per gram of assimilable solids in the medium; and "expected percentage of pick-up" is the percentage of the total vitamin B₁ originally in the medium that is assimilated by the yeast crop.

5. A process of treating industrial waste products containing small quantities of vitamin B₁ which comprises preparing from said products a carbohydrate-containing nutrient medium capable of supporting the growth of a yeast culture therein, said prepared medium having a vitamin B₁ potency between 100 and 10,000 International units per liter and having a fermentable carbohydrate content such that the ratio of International units of vitamin B₁ to grams of fermentable carbohydrate in the medium is between about 30 and 300, inoculating the medium with a quantity of yeast cells which is less than about one third of that quantity of yeast cells capable of developing in the medium on incubation, incubating the medium to get the desired at least three-fold increase in said yeast cells whereby the cells assimilate a substantial proportion of the vitamin B₁ in the medium, and separating the resulting cells having a high vitamin B₁ potency.

6. A process of salvaging vitamin B₁ from waste brewery products containing yeast which comprises preparing therefrom a yeast water extract medium having a vitamin B₁ potency between 100 and 10,000 International units per liter, adding a yeast fermentable carbohydrate to said medium in an amount such that the ratio of International units of vitamin B₁ to grams of fermentable carbohydrate in the medium is between about 30 and 300, inoculating the medium with a quantity of yeast cells which is less than about one third of that quantity of yeast cells capable of developing in the medium on incubation, incubating the medium to get the desired at least three-fold increase in said yeast cells whereby the cells assimilate a substantial proportion of the vitamin B₁ in the medium, and separating the resulting cells having a high vitamin B₁ potency.

7. A method of producing a mass of yeast cells having a predetermined vitamin B₁ potency which comprises preparing a vitamin B₁-containing vegetable extract medium capable of supporting the growth of yeast therein, inoculating the medium with a quantity of yeast cells, incubating the resulting medium to get an at least three-fold increase in said yeast cells, whereby said cells assimilate a substantial proportion of the vitamin B₁ in the medium, and separating the cells having the desired vitamin B₁ potency, said medium containing a fermentable sugar and vitamin B₁ in relative concentrations represented by the following formula:

$$\text{Ratio } \frac{B_1}{\text{sugar}} = \frac{\text{desired potency} \times \text{yeast crop}}{\text{expected percentage of pick-up}}$$

wherein $$\text{"Ratio } \frac{B_1}{\text{sugar}}\text{"}$$

is in International units of vitamin $B_1$ per gram of assimilable solids in the medium; "desired potency" is expressed in International units of $B_1$ per gram of the resulting dried yeast crop; "yeast crop" is the number of grams of dried yeast substance (including inoculum) produced per gram of assimilable solids in the medium; and "expected percentage of pick-up" is the percentage of the total vitamin $B_1$ originally in the medium that is assimilated by the yeast crop.

8. A method of producing a mass of yeast cells having a predetermined vitamin $B_1$ potency which comprises preparing a vitamin $B_1$-containing yeast extract medium capable of supporting the growth of yeast therein, inoculating the medium with a quantity of yeast cells, incubating the resulting medium to get a substantial growth of said yeast cells whereby said cells assimilate a substantial proportion of the vitamin $B_1$ in the medium, and separating the cells having the desired vitamin $B_1$ potency, said medium containing a fermentable sugar and vitamin $B_1$ in relative concentrations represented by the following formula:

$$\text{Ratio } \frac{B_1}{\text{sugar}} = \frac{\text{desired potency} \times \text{yeast crop}}{\text{expected percentage of pick-up}}$$

wherein $$\text{"Ratio } \frac{B_1}{\text{sugar}}\text{"}$$

is in International units of vitamin $B_1$ per gram of assimilable solids in the medium; "desired potency" is expressed in International units of $B_1$ per gram of the resulting dried yeast crop; "yeast crop" is the number of grams of dried yeast substance (including inoculum) produced per gram of assimilable solids in the medium; and "expected percentage of pick-up" is the percentage of the total vitamin $B_1$ originally in the medium that is assimilated by the yeast crop.

HENRY J. GORCICA.
HAROLD LEVINE.